US006523621B1

(12) United States Patent
Gosis et al.

(10) Patent No.: US 6,523,621 B1
(45) Date of Patent: Feb. 25, 2003

(54) DELAY-INTERRUPTION CONNECTOR FOR PNEUMATIC TOOL

(75) Inventors: Anatoly Gosis, Palatine, IL (US); G. Michael Velan, Mount Prospect, IL (US); Aaron V. Monje, Chicago, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/943,656

(22) Filed: Aug. 31, 2001

(51) Int. Cl.[7] .............................................. B23B 45/04

(52) U.S. Cl. ........................ 173/206; 173/168; 173/169

(58) Field of Search ................................ 173/168, 169, 173/206

(56) References Cited

U.S. PATENT DOCUMENTS

| | | | | |
|---|---|---|---|---|
| 3,033,236 A | | 5/1962 | Rayman et al. | |
| 3,580,285 A | | 5/1971 | Brandenberg | |
| 3,732,934 A | | 5/1973 | Brandenberg | |
| 3,934,657 A | * | 1/1976 | Danielson | 173/169 |
| 3,970,110 A | * | 7/1976 | Schaedler et al. | 137/613 |
| 4,243,111 A | * | 1/1981 | Willoughby et al. | 173/169 |
| 4,834,131 A | * | 5/1989 | Austin | 137/115.26 |
| 5,439,063 A | | 8/1995 | Anders et al. | |
| 5,673,759 A | | 10/1997 | Biek | |
| 6,161,628 A | * | 12/2000 | Liu | 173/168 |

* cited by examiner

*Primary Examiner*—Scott A. Smith
*Assistant Examiner*—Chukwurah Nathaniel
(74) *Attorney, Agent, or Firm*—Schwartz & Weinrieb

(57) ABSTRACT

A fluidic connector comprises an independent adjunct to a pneumatic tool and is adapted to be fluidically interposed between an air supply hose and a fitting of the pneumatic tool. The connector comprises a piston-type valve member. Exhaust generated from each fastener firing operation or cycle maintains the piston-type valve member at a first position so as to permit the incoming air supply to reach the tool, however, if the tool is not fired within a predetermined period of time, the piston-type valve member is automatically moved to a second position which prevents the air supply from reaching the tool thereby disabling the same.

25 Claims, 2 Drawing Sheets

DELAY-INTERRUPTION CONNECTOR FOR PNEUMATIC TOOL

FIELD OF THE INVENTION

The present invention relates generally to pneumatically operated fastener-driving tools, and more particularly to a new and improved separate and independent in-line connector device which is adapted to be operatively interposed between the fastener-driving tool air inlet supply hose and the fastener-driving tool air hose connection tap or fitting so as to permit incoming supply air to be fluidically conducted into the tool when the tool is disposed in an operative condition or state, however, the device will terminate the flow of the incoming supply air to the tool if the tool has not been disposed in an operative firing condition or state for a predetermined period of time.

BACKGROUND OF THE INVENTION

As is well known in the art, fastener-driving tools can be operated in any one of several different operational modes. It is also well-known in the industry that such fastener-driving tools are normally equipped with a safety mechanism, or a control circuit or system, by means of which the tool normally cannot be fired unless both the trigger mechanism is activated or depressed and simultaneously therewith, the nosepiece, for example, of the tool is forcefully depressed against the workpiece or substrate into which a fastener is to be driven so as to effectively cause the safety device or mechanism of the tool to be moved thereby permitting firing of the tool. One commonly known and practiced mode of operation comprises a bump-firing mode of operation wherein, for example, the operator maintains the trigger mechanism of the tool constantly activated or depressed, and subsequently, each time the nosepiece of the tool is forcefully engaged and depressed against the workpiece or substrate into which a fastener is to be driven, the tool is able to be fired. Consequently, a bump-firing mode of operation enables an operator to rapidly fire the tool and thereby install a large number of fasteners within a relatively short period time.

Despite the aforenoted attempt to render such fastener-driving tools safe by incorporating therein the noted safety device or mechanism requiring the simultaneous activation or depression of the trigger mechanism of the tool and the forceful engagement or depression of the nosepiece of the tool against the workpiece or substrate into which the fasteners are to be driven, it has been realized that such fastener-driving tools can nevertheless constitute a safety hazard and create an operationally dangerous environment. For example, it has been realized that if an operator maintains the trigger mechanism of the fastener-driving tool constantly activated or depressed, and simultaneously therewith, accidentally or inadvertently causes the nosepiece of the tool to be engaged or depressed as a result of coming into contact with some object other than, for example, the desired workpiece or substrate, the tool is in fact enabled and can accordingly fire whereby the accidentally or inadvertently discharged fastener obviously presents a safety hazard and a dangerous environment to the tool operator and other personnel who may be within the immediate vicinity of the tool. Accordingly, still further, such fastener-driving tools of the aforenoted type have had additional safety devices, mechanisms, or systems incorporated therein in an attempt to effectively prevent the firing of the tool under the aforenoted accidental or inadvertent conditions, however, such additional safety devices, mechanisms, or systems have been quite elaborate and complex, and have added significant production costs to the tool fabrication or manufacturing operations.

A need therefore exists in the art for a new and improved safety device or mechanism which can be operatively associated with a pneumatically-powered fastener-driving tool so as to effectively prevent the tool from being accidentally or inadvertently operated, and yet readily permit the intentionally desired operation of the tool in a relatively simplistic manner. In addition, the new and improved safety device or mechanism should be capable of being operatively associated with the pneumatically-powered fastener-driving tool without necessarily being integrally incorporated within the tool so as not to render the same elaborate and operationally complex, and accordingly, not to render the resulting cost of the fastener-driving tools prohibitively expensive.

OBJECTS OF THE INVENTION

Accordingly, it is an object of the present invention to provide a new and improved safety device or mechanism which can be operatively associated with a pneumatically-powered fastener-driving tool so as to effectively prevent the tool from being accidentally or inadvertently operated.

Another object of the present invention is to provide a new and improved safety device or mechanism which can be operatively associated with a pneumatically-powered fastener-driving tool so as to effectively prevent the tool from being accidentally or inadvertently operated while at the same time effectively overcoming the various operational and economic drawbacks characteristic of PRIOR ART devices and tools.

An additional object of the present invention is to provide a new and improved safety device or mechanism which can be operatively associated with a pneumatically-powered fastener-driving tool so as to effectively prevent the tool from being accidentally or inadvertently operated and yet not necessarily be integrally incorporated within the tool so as not to render the tool elaborate and operationally complex.

A further object of the present invention is to provide a new and improved safety device or mechanism which can be operatively associated with a pneumatically-powered fastener-driving tool so as to effectively prevent the tool from being accidentally or inadvertently operated and yet may be integrally attached to the fastener-driving tool as an adjunct whereby the resulting tool nevertheless remains operationally simple.

A last object of the present invention is to provide a new and improved safety device or mechanism which can be operatively associated with a pneumatically-powered fastener-driving tool so as to effectively prevent the tool from being accidentally or inadvertently operated and yet is a relatively adjunct to the tool so as not to significantly enhance the fabrication or manufacturing costs of the tool.

SUMMARY OF THE INVENTION

The foregoing and other objectives are achieved in accordance with the teachings and principles of the present invention through the provision of a new and improved safety device or mechanism which can be operatively associated with a pneumatically-powered fastener-driving tool and which comprises in effect a connector device or mechanism which can be quickly operationally and fluidically interposed and connected between the air supply hose for the tool and the fitting or tap integrally provided or incorporated upon the tool by means of conventional quick connect/disconnect fittings. The connector has a fluidic flow path defined internally within the connector housing, and a valve member operatively controls the fluidic communication between the air supply hose and the tool air fitting. The valve member is operatively connected to a manual ring actuator assembly mounted upon the connector housing and is initially moved to its OPEN position when the manual ring actuator assembly is manually moved away from the air supply hose, and is spring-biased toward its CLOSED position against the operative resistance of an internally housed hydraulic fluid. Alternatively, the valve member may be pneumatically biased toward the CLOSED position. In either case, the closure of the valve member is effectively controlled in a predeterminedly timed manner.

In order to maintain the valve member at the OPEN position, the exhaust, generated within the tool as a result of each fastener-firing operational cycle, is routed from an exhaust port of the tool to the connector so as to act upon a piston member operatively connected to the valve member. Accordingly, unless the tool is subsequently fired within a predetermined period of time, thereby permitting additional exhaust from the subsequent fastener-firing cycles to impact upon the piston member operatively associated with the valve member, the valve member will be moved to the CLOSED position under the biasing force of the spring, or the pneumatic force of the air supply, thereby effectively disabling the tool by preventing pneumatic airflow to the tool. At the same time, any residual enabling air within the tool is also drained from the tool. Therefore, even if the operator maintains the tool firing trigger mechanism in an activated or depressed state, the tool cannot be inadvertently or unintentionally fired. In order to be able to subsequently fire the tool, the manual ring actuator assembly must once again be moved in the noted direction against the biasing force of the valve member spring or the supply air so as to move the valve member to its OPEN position.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
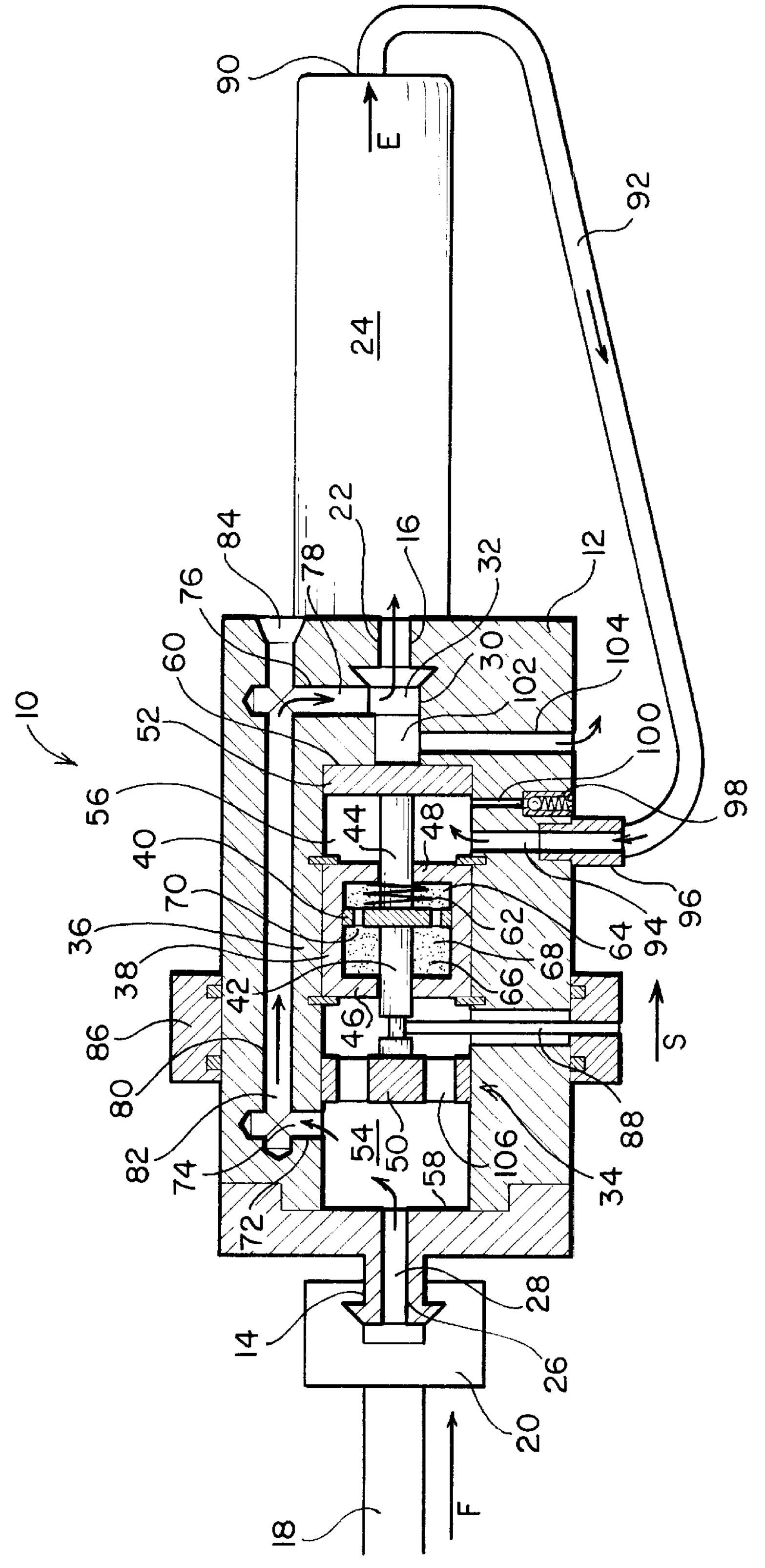
FIG. 1 is a partial cross-sectional view of a first embodiment of a new and improved fluidic connector for use in connection with a pneumatically-operated fastener-driving tool so as to control the actuation of the tool and to effectively prevent the inadvertent or accidental actuation thereof.

Referring now to the drawings, and more particularly to FIG. 1 thereof, a new and improved fluidic connector, for use in connection with a pneumatically-operated fastener-driving tool so as to control the actuation of the tool and to effectively prevent the inadvertent or accidental actuation thereof, is disclosed and is generally indicated by the reference character 10. The fluidic connector 10 is seen to comprise a housing 12 wherein an upstream end portion thereof, as considered in the direction of the incoming air flow F, has an integral male quick connect/disconnect fitting 14 formed thereon, while a downstream end portion of the housing 12 has a female quick connect/disconnect fitting 16 integrally formed therein. An air supply hose 18, which is integrally provided upon a free end portion thereof with a female quick connect/disconnect fitting 20, is normally or usually adapted to be operatively and fluidically connected to a male quick connect/disconnect fitting 22 which is integrally provided upon a pneumatically operated fastener-driving tool 24, however, in accordance with the principles and teachings of the present invention, the fluidic connector 10 is adapted to be structurally, operationally, and fluidically interposed between the air supply hose 18 and the fastener-driving tool 24. More particularly, in lieu of the structural, operative, and fluidic connection normally being achieved between the male fitting 22 of the fastener-driving tool 24 and the female fitting 20 of the air supply hose 18, the female fitting 20 of the air supply hose 18 is operatively, structurally, and fluidically connected to the male fitting 14 of the fluidic connector 10 while the male fitting 22 of the fastener-driving tool 24 is operatively, structurally, and fluidically connected to the female fitting 16 of the fluidic connector 10.

Continuing further, it is seen that the fluidic connector housing 12 is provided with a first upstream axially oriented bore 26 that defines a first axially oriented fluid conduit 28 which is fluidically connected to the male fitting end portion 14 of the fluidic connector 10, and a second downstream axially oriented bore 30 that defines a second axially oriented fluid conduit 32 which is fluidically connected to the female fitting 16 of the fluidic connector 10. A valve assembly 34 is operatively, structurally, and fluidically interposed between the first and second axial bores 26,30 and the first and second fluid conduits 28, 32 thereof, and it is seen that the valve assembly 34 comprises a first external cylinder housing 36 and a second internal cylinder housing or block 38 fixedly mounted within the first external cylinder housing 36. A first piston member 40 is movably disposed within the second internal cylinder housing or block 38 and has a pair of piston rods 42,44 which extend in oppositely oriented axial directions through oppositely disposed end walls 46,48 of the second internal cylinder housing or block 38. The opposite distal or free end portions of the piston rods 42,44 have piston members 50,52 fixedly mounted thereon such that the piston members 50,52 are reciprocally movable within piston chambers 54,56 which are respectively defined between end walls 58,60 of the first external cylinder housing 36 and the end walls 46, 48 of the second internal cylindrical housing or block 38. The first axially oriented fluid conduit 28 defined within the first upstream axially oriented bore 26 formed within the connector housing 12, and fluidically connected to the male fitting end portion 14, is also fluidically connected to the piston chamber 54. A coil spring member 62 is disposed within a right chamber 64, of the second cylinder housing or block 38, as defined between the piston member 40 and the right end wall 48 of the cylinder housing or block 38 so as to be coaxially disposed around the piston rod 44. A left chamber 66 of cylinder housing or block 38 is similarly defined between the piston member 40 and the left end wall 46 of the cylinder housing or block 38, and a hydraulic fluid 68 is disposed within the left cylinder chamber 66. The piston member 38 is provided with a plurality of axially oriented apertures or bores 70 defined therethrough which permit fluidic communication of the hydraulic fluid 68 between the left and right cylinder housing chambers 66,64, the significance of which will be more fully discussed hereinafter. It can thus be appreciated that the coil spring member 62 always tends to bias the piston member 40 toward the left as viewed in FIG. 1 such that the hydraulic fluid 68 disposed within the left cylinder chamber 66 will be forced through the apertures or holes 70 and into the right cylinder chamber 64.

With reference still being made to FIG. 1, it is further seen that a first end portion of a first radially oriented bore 72, defining a fluid conduit 74, is fluidically connected to the piston chamber 54, a first end portion of a second radially oriented bore 76, defining a fluid conduit 78, is fluidically connected to the fluid conduit 32 defined within the second axial bore 30, and a third axially oriented bore 80, defining a fluid conduit 82, fluidically interconnects second end portions of the radially oriented fluid conduits 74,78, the open end of the axial bore 80 being capped in effect by means of a suitable plug 84. It can therefore be appreciated that a fluid conduit or flow path for the incoming air from air supply hose 18 to the tool 24 is able to be defined by means of first axial fluid conduit 28, piston chamber 54, first radial fluid conduit 74, third axial fluid conduit 82, second radial fluid conduit 78, and second axial fluid conduit 32.

A manual actuator ring 86 is operatively connected to piston rod 42 by means of a connector rod 88 and is adapted to be slidably mounted upon the connector housing 12 in the direction noted by the arrow S. As can therefore be appreciated, when the manual actuator ring 86 is disposed at an extreme leftward position as a result of the biasing force or influence of the coil spring 62 acting upon the piston member 40 thereby forcing the piston member 40 into engagement with the left end wall 46 of the cylinder housing or block 38, the piston 50 will in effect block the fluid flow of the incoming supply air from fluid conduit 28 into fluid conduit 74 whereby the tool 24 cannot be fired. Alternatively, when the manual actuator ring 86 is moved toward the right so as to be disposed at the illustrated position shown in FIG. 1, thereby forcing the piston rod 42 and the piston member 40 toward the right against the biasing force of the coil spring 62, the piston 50 will effectively uncover the fluid conduit 74 whereby the incoming air from air supply hose 18 can be transmitted or conducted to the tool 24 by means of third axial fluid conduit 82, second radial fluid conduit 78, and second axial fluid conduit 32 such that the tool 24 is enabled for firing. In order to therefore achieve a fastener driving operation, the tool 24 will initially be operatively connected to the connector housing 12 as a result of the mating of the male and female quick connect/disconnect mechanisms 22,16, and the connector housing 12 will likewise be operatively connected to the air supply hose 18 as a result of the mating of the male and female quick connect/disconnect mechanisms 14,20.

As is conventional, the tool 24 will then be engaged with the workpiece or substrate, not shown, into which the fastener is to be driven such that a nosepiece portion, also not shown, of the tool 24 will be moved to a tool-enabling position or state. However, the tool 24 will not as yet in fact be enabled because the manual actuator ring 86 is initially disposed at its extreme leftward position at which piston 50 covers the entrance to fluid conduit 74 such that incoming air from air supply hose 18 cannot be transmitted to the tool 24 as has been discussed hereinbefore. In accordance with the principles and teachings of the present invention, however, when the manual actuator ring 86 is operatively moved toward its extreme right position, so as to be disposed at the illustrated position shown in FIG. 1, thereby forcing the piston rod 42 and the piston member 40 toward the right against the biasing force of coil spring 62, the piston 50 will effectively uncover the fluid conduit 74 whereby the incoming air from air supply hose 18 can now be transmitted or conducted to the tool 24. If the tool firing trigger mechanism, not shown, has already been activated or depressed, or is subsequently activated or depressed, then the tool 24 will fire and a fastener will be driven into the workpiece or substrate. It is further noted that as a result of each fastener firing cycle, the tool 24 will generate exhaust which is conducted toward a tool exhaust port 90 of the tool 24 as denoted by means of the arrow E. In accordance with the principles and teachings of the present invention, one end of an exhaust conduit 92 is fluidically connected to the exhaust port 90 while the opposite end of the exhaust conduit 92 is fluidically connected to the piston chamber 56 through means of an inlet port 94 defined within the connector housing 12 and a suitable quick connect and disconnect fitting 96.

It can therefore be readily appreciated that each time the tool 24 is fired so as to drive a fastener into an underlying workpiece or substrate, exhaust impulses generated during the fastener firing cycle will be transmitted or conducted into piston chamber 56 so as to effectively move piston 52 toward, or maintain piston 52 at, its respective extreme right position. Obviously, at the same time or simultaneously therewith, in view of the integral connection of the piston 52 to the piston rods 44,42, and the mounting of the pistons 40,50 upon the piston rod assembly 42,44, pistons 40,50 will likewise be moved toward, or maintained at, their extreme right positions whereby fluid conduit 74 remains uncovered. Accordingly, as long as the tool 24 is repetitively operated or fired so as to serially drive and install a plurality of fasteners into particular substrates or workpieces, the tool 24 will effectively remain enabled. Therefore, the tool 24 can be repetitively removed from its engaged position in contact with a workpiece or substrate so as to perform, for example, the discharge of fasteners in accordance with the aforenoted "bump-firing" mode of operation wherein, as a result of the tool firing trigger or mechanism being constantly activated or depressed, and the nosepiece portion of the tool, not shown, being intermittently engaged with the workpiece or substrate, the manual actuator ring 86 will be maintained at its extreme right position so as to constantly enable the firing of the tool 24 as desired. It is noted that a one-way check valve 98 is mounted within the connector housing 12 and is fluidically connected to the piston chamber 56 by means of a radial bore 100. In this manner, if the tool 24 is repetitively fired in a rapid-fire mode whereby it is possible that the pressure attendant the exhaust impulses, as transmitted into piston chamber 56 from the tool exhaust port 90, becomes excessive, such excessive pressure can be relieved.

Alternatively, however, if the tool 24 is not fired within a predetermined period of time whereupon an exhaust gas impulse from exhaust port 90 is not conducted or transmitted into piston chamber 56, then the spring-biasing force of coil spring 62 begins to move piston 40 toward the left, and as has been noted hereinbefore, in view of the integral piston assembly comprising pistons 50,40, and 52, along with piston rods 42,44, piston 50 begins to move toward the left until such time that piston 50 again covers the entranceway to fluid conduit 74 whereby no further air supply is able to be conducted to the tool 24. It is noted that as piston 40 is moved toward the left within cylinder housing or block 38 under the biasing influence of the coil spring 62, piston 40 encounters a predetermined amount of resistance as determined by means of the viscosity of the hydraulic fluid 68, the number of through-apertures 70 formed within the piston 40, and the size of each through-aperture 70 within the piston 40. Accordingly, such aforenoted factors comprising the viscosity of the hydraulic fluid 68, and the number and size of the through-apertures 70 defined within the piston 40, predetermine the speed at which the hydraulic fluid 68 will pass through the apertures 70 of the piston 40 and the corresponding speed at which piston 40 will able to be moved toward the left as seen in FIG. 1. These movements of the hydraulic fluid 68 and the piston 40, and in turn, the movement of the piston 50, establishes a predetermined time period at the conclusion of which the tool 24 will effectively be disabled as a result of piston 50 covering fluid conduit 74. In practice, a predetermined time period of, for example, 10–15 seconds, has been deemed satisfactory.

Concomitant with the aforenoted termination of the air flow into fluid conduit 74 by means of the piston 50 covering the entrance to fluid conduit 74, piston 52 has another piston rod 102 integrally connected thereto which is also disposed within the axial bore 30 and accordingly, as piston 52 moves toward the left, piston rod 102 uncovers a connector drain port 104 whereby any residual air within the tool 24 is discharged and the tool 24 is ensured to be absolutely disabled. Therefore, even if an operator carries the tool 24 with the tool firing trigger or mechanism, not shown, constantly activated or depressed, and even if the operator accidentally or inadvertently presses the nosepiece, not shown, of the tool 24 against some object, for example, and particularly, an object which is not a desired workpiece or substrate, the tool 24 will not fire and therefore will not present a safety hazard to the operator or other personnel. Accordingly, in order to again place the tool 24 within an enabling firing mode, the manual actuator ring 86 must again be manually moved to the extreme right position.

Figure 2:
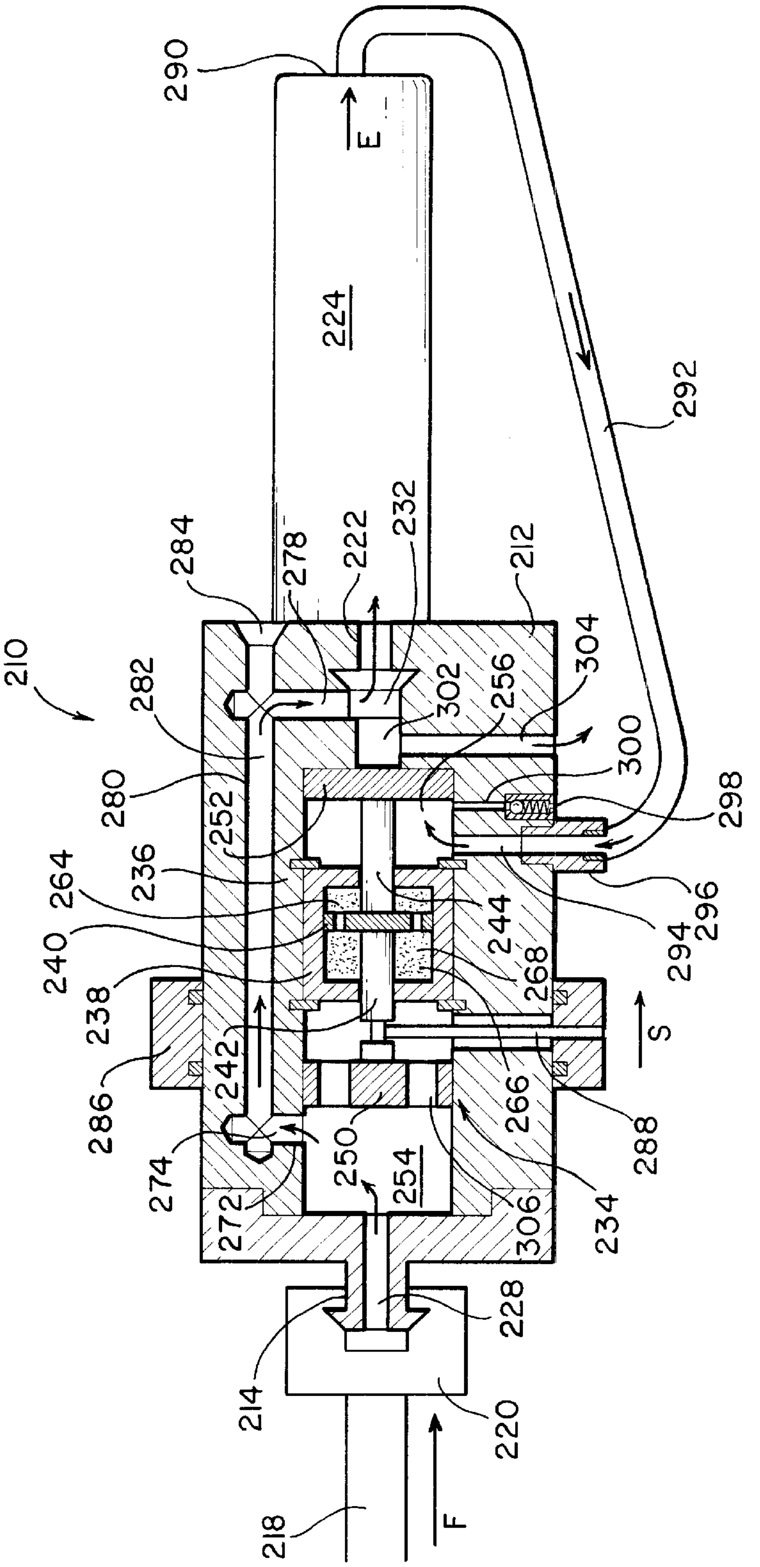
FIG. 2 is view similar to that of FIG. 1 showing, however, a second embodiment of a new and improved fluidic connector for use in connection with a pneumatically-operated fastener-driving tool so as to likewise control the actuation of the tool and to effectively prevent the inadvertent or accidental actuation thereof.

With reference lastly being made to FIG. 2, a modified second embodiment of a fluidic connector, similar to the fluidic connector 10 illustrated in FIG. 1, is disclosed and is generally indicated by the reference character 210. In view of the similarities between the first and second embodiments of the fluidic connectors 10,210, a detailed description of the second embodiment 210 will not be set forth for brevity reasons, and the discussion will be directed toward only the differences comprising the embodiments. In addition, it is noted that the various structural components of the fluidic connector 210 which correspond to those structural components of the fluidic connector 10 will be designated by similar reference characters, however, the reference characters will be within the 200 and 300 series. More particularly, it is noted that, in accordance with the teachings and principles of the present invention as embodied within the second embodiment of the fluidic connector 210, the coil spring member 62 that was disposed around the piston 44 has been eliminated with respect to piston 244. It is further noted that as is the case with piston 50, piston 250 is provided with a plurality of through-bores or apertures 306 such that the incoming supply air does not act upon piston 250 with any significant force. The air can thus pass through bores or apertures 306 and impact upon the cylinder housing or block 238, however, since the cylinder housing or block 238 is fixed, such air pressure has no significant effect upon the operation of the system.

It is likewise appreciated that the air pressure characteristic of the air flow being discharged from fluid conduit 278 during enablement of the tool 224 also impacts upon the piston rod 302, however, during the cyclical firing of the tool 224, the pressure impacted upon the piston 252 by means of the tool exhaust from fluid conduit 292 and port 294 vastly overcomes the pressure impacted upon the piston rod 302 by means of the air flow being discharged from fluid conduit 278 whereby during such cyclical firing of the tool 224, piston 252 will be substantially maintained at its extreme right position as illustrated in FIG. 2. However, when the tool 224 has not been fired for a predetermined amount of time, although the tool 224 is still enabled, in view of the fact that new pressure impulses are not being conducted into the piston chamber 256, the fluid flow from fluid conduit 278 will in fact be sufficient to cause movement of the piston rod 302, piston 252, piston 240, and piston 250 toward the left whereupon when piston 250 covers the entrance into fluid conduit 274, and when piston rod 302 uncovers the drain conduit 304, the tool 224 is disabled. Accordingly, spring 62, as disclosed within the fluidic connector 10, has been able to be eliminated, and it is appreciated that the incoming supply air serves in effect as a pneumatic spring so as to effectively return or bias the entire piston assembly toward its extreme left tool-disabling position.

Thus, it may be seen that in accordance with the principles and teachings of the present invention, there has been provided a new and improved fluidic connector which is an independent adjunct to a pneumatic tool and is adapted to be fluidically interposed between an air supply hose and a fitting of the pneumatic tool. The connector comprises a manual ring actuator which is operatively connected to a piston-type valve member so as to permit air to be conducted to the tool when the manual ring actuator is manually moved to an extreme position. Consequently, when the tool firing trigger is activated and depressed, and the tool nosepiece is engaged with a workpiece or substrate into which the fasteners are to be driven, the tool will be enabled and can be fired. Exhaust generated from each fastener firing operation or cycle maintains the piston-type valve member at the desired position so as to permit the incoming air supply to reach the tool, however, if the tool is not fired for a pre-determined period of time, the piston-type valve member is moved to a CLOSED position under a spring-biasing or pneumatic biasing force thereby disabling the tool even if the tool firing trigger and nosepiece are both activated or depressed. Enablement of the tool is only again achieved by moving the manual ring actuator to the extreme position. The disabling of the tool therefore prevents the inadvertent or accidental firing of the tool.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A fluidic connector for providing a fluidic connection between a supply of air and a pneumatically-operated tool, comprising:

a housing;

first connection means integrally formed upon said housing for connection to an air supply;

second connection means integrally formed upon said housing for connection to a pneumatically-operated tool;

a fluid circuit defined within said housing for providing a fluid flow path between said first connection means and said second connection means so as to conduct air from the air supply to the pneumatically-operated tool; and a valve assembly, disposed within said housing and operatively associated with said fluid circuit defined within said housing, for permitting air to flow from the air supply to the pneumatically-operated tool when said valve assembly is disposed at a first position as a result of the pneumatically-operated tool being operated within a predetermined period of time such that the pneumatically-operated tool is operationally enabled, and for terminating the air flow from the air supply to the pneumatically-operated tool when said valve assembly is automatically moved to a second position as a result of the pneumatically-operated tool not having been operated within the predetermined period of time so as to render the pneumatically-operated tool operationally disabled.

2. The fluidic connector as set forth in claim 1, wherein said valve assembly comprises:

a first piston operatively disposed within a first cylinder and operatively associated with a fluid entrance port to said fluid circuit for permitting air to flow from the air supply to the pneumatically-operated tool when said first piston is disposed at a first position such that the pneumatically-operated tool can be cyclically operationally enabled, and for terminating the air flow from the air supply to the pneumatically-operated tool as a result of said first piston being automatically moved to a second position when the pneumatically-operated tool has not been operated for a predetermined period of time so as to render the pneumatically-operated tool operationally disabled.

3. The fluidic connector as set forth in claim 2, further comprising:

a manual actuator mounted externally of said housing and operatively connected to said first piston so as to manually move said first piston to said first position and thereby permit air to flow from the air supply to the pneumatically-operated tool such that the pneumatically-operated tool can be cyclically operationally enabled; and means operatively connected to said first piston for automatically moving said first piston to said second position when the pneumatically-operated tool has not been operated for a predetermined period of time so as to terminate the air flow from the air supply to the pneumatically-operated tool so as to render the pneumatically-operated tool operationally disabled.

4. The fluidic connector as set forth in claim 3, wherein said means operatively connected to said first piston for automatically moving said first piston to said second position, comprises:

a first piston rod having a first end thereof connected to said first piston;

a second piston connected to a second end of said first piston rod; and a spring member operatively connected to said second piston for biasing said first piston, through means of said second piston and said first piston rod, toward said second position so as to terminate the air flow from the air supply to the pneumatically-operated tool when the pneumatically-operated tool has not been operated for a predetermined period of time so as to render the pneumatically-operated tool operationally disabled.

5. The fluidic connector as set forth in claim 4, wherein:

said second piston is disposed within a second cylinder such that said second piston effectively divides said second cylinder into first and second piston chambers;

a hydraulic fluid is disposed within said first piston chamber; and said spring member is disposed within said second piston chamber so as to normally bias said second piston with a predetermined biasing force against the resistance of said hydraulic fluid.

6. The fluidic connector as set forth in claim 5, wherein:

said second piston has a plurality of holes defined therethrough so as to permit said hydraulic fluid to flow between said first and second piston chambers as said second piston is reciprocally moved within said second cylinder.

7. The fluidic connector as set forth in claim 6, wherein:

said plurality of holes defined within said second piston comprises a predetermined number of holes;

each one of said predetermined number of holes defined within said second piston has a predetermined diametrical extent; and said hydraulic fluid has a predetermined viscosity value, whereby said predetermined number of holes defined within said second piston, said predetermined diametrical extent of each one of said predetermined number of holes, and said predetermined viscosity value of said hydraulic fluid all comprise factors which predetermine the speed at which said first piston, through means of said first piston rod and said second piston, moves toward said second position and therefore in turn the predetermined time period in which the pneumatically-operated tool must again be operated such that said first piston does not terminate the air flow from the air supply to the pneumatically-operated tool so as to render the pneumatically-operated tool operationally disabled.

8. The fluidic connector as set forth in claim 7, wherein:

said predetermined number of holes defined within said second piston, said predetermined diametrical extent of each one of said predetermined number of holes, and said predetermined viscosity value of said hydraulic fluid are such that said predetermined time period, in which the pneumatically-operated tool must again be operated such that said first piston does not terminate the air flow from the air supply to the pneumatically-operated tool so as to render the pneumatically-operated tool operationally disabled, is within the range of 10–15 seconds.

9. The fluidic connector as set forth in claim 3, wherein said means operatively connected to said first piston for automatically moving said first piston to said second position, comprises:

a first piston rod having a first end thereof connected to said first piston;

a second piston connected to a second end of said first piston rod;

a second piston rod having a first end thereof connected to said second piston;

a third piston connected to a second end of said second piston rod;

an exhaust conduit fluidically connected between a third cylinder portion of said housing, within which said third piston is operatively disposed, and an exhaust fitting of the pneumatically operated tool for fluidically conducting exhaust gas impulses against said third piston so as to maintain said first piston, through means of said first piston rod, said second piston, said second piston rod, and said third piston, at said first position so as to permit air to flow from the air supply to the pneumatically-operated tool whereby the pneumatically-operated tool can be cyclically operationally enabled; and a portion of said fluid circuit defined within said housing for providing a fluid flow path from said first connection means to said third piston such that supply air operatively impacts against said third piston so as to move said first piston to said second position in the absence of exhaust gas impulses acting upon said third piston.

10. The fluidic connector as set forth in claim 5, further comprising:

a second piston rod having a first end thereof connected to said second piston;

a third piston connected to a second end of said second piston rod; and an exhaust conduit fluidically connected between a third cylinder portion of said housing, within which said third piston is operatively disposed, and an exhaust fitting of the pneumatically operated tool for fluidically conducting exhaust gas impulses against said third piston so as to maintain said first piston, through means of said first piston rod, said second piston, said second piston rod, and said third piston, at said first position so as to permit air to flow from the air supply to the pneumatically-operated tool whereby the pneumatically-operated tool can be cyclically operationally enabled, and for permitting said spring member to bias said first piston, through means of said second piston and said first piston rod, toward said second position so as to terminate the air flow from the air supply to the pneumatically-operated tool in the absence of exhaust gas impulses acting upon said third piston as a result of the pneumatically-operated tool having not been operated for a predetermined period of time so as to render the pneumatically-operated tool operationally disabled.

11. The fluidic connector as set forth in claim 10, further comprising:

a drain port defined within said housing and fluidically connected to said second connection means integrally formed upon said housing for connection to the pneumatically-operated tool; and a fourth piston rod connected to said third piston for movement with said third piston between a first position at which said fourth piston rod covers said drain port, when said first piston is disposed at said first position as a result of the exhaust gas impulses being conducted against said third piston, and a second position at which said fourth piston rod uncovers said drain port, when said first piston is disposed at said second position, so as to permit drainage of any residual air within the pneumatically-operated tool so as to ensure the pneumatically-operated tool is operationally disabled.

12. The fluidic connector as set forth in claim 10, further comprising:

a one-way check-valve fluidically connected to said third cylinder portion of said housing for relieving excessive exhaust pressure within said third cylinder portion of said housing.

13. In combination with a pneumatically-operated tool, a fluidic connector for providing a fluidic connection between a supply of air and a pneumatically-operated tool, comprising:

an air supply;

a pneumatically-operated tool;

a housing;

first connection means integrally formed upon said housing for connection to said air supply;

second connection means integrally formed upon said housing for connection to said pneumatically-operated tool;

a fluid circuit defined within said housing for providing a fluid flow path between said first connection means and said second connection means so as to conduct air from said air supply to said pneumatically-operated tool; and a valve assembly, disposed within said housing and operatively associated with said fluid circuit defined within said housing, for permitting air to flow from said air supply to said pneumatically-operated tool when said valve assembly is disposed at a first position as a result of said pneumatically-operated tool being operated within a predetermined period of time such that said pneumatically-operated tool is operationally enabled, and for terminating said air flow from said air supply to said pneumatically-operated tool when said valve assembly is automatically moved to a second position as a result of said pneumatically-operated tool not having been operated within the predetermined period of time so as to render said pneumatically-operated tool operationally disabled.

14. The combination as set forth in claim 13, wherein said valve assembly comprises:

a first piston operatively disposed within a first cylinder and operatively associated with a fluid entrance port to said fluid circuit for permitting air to flow from said air supply to said pneumatically-operated tool when said first piston is disposed at a first position such that said pneumatically-operated tool can be cyclically operationally enabled, and for terminating said air flow from said air supply to said pneumatically-operated tool as a result of said first piston being automatically moved to a second position when said pneumatically-operated tool has not been operated for a predetermined period of time so as to render said pneumatically-operated tool operationally disabled.

15. The combination as set forth in claim 14, further comprising:

a manual actuator mounted externally of said housing and operatively connected to said first piston so as to manually move said first piston to said first position and thereby permit air to flow from said air supply to said pneumatically-operated tool such that the pneumatically-operated tool can be cyclically operationally enabled; and means operatively connected to said first piston for automatically moving said first piston to said second position when said pneumatically-operated tool has not been operated for a predetermined period of time so as to terminate said air flow from said air supply to said pneumatically-operated tool so as to render said pneumatically-operated tool operationally disabled.

16. The combination as set forth in claim 15, wherein said means operatively connected to said first piston for automatically moving said first piston to said second position, comprises:

a first piston rod having a first end thereof connected to said first piston;

a second piston connected to a second end of said first piston rod; and a spring member operatively connected to said second piston for biasing said first piston, through means of said second piston and said first piston rod, toward said second position so as to terminate said air flow from said air supply to said pneumatically-operated tool when said pneumatically-operated tool has not been operated for a predetermined period of time so as to render said pneumatically-operated tool operationally disabled.

17. The combination as set forth in claim 16, wherein:

said second piston is disposed within a second cylinder such that said second piston effectively divides said second cylinder into first and second piston chambers;

a hydraulic fluid is disposed within said first piston chamber; and said spring member is disposed within said second piston chamber so as to normally bias said second piston with a predetermined biasing force against the resistance of said hydraulic fluid.

18. The combination as set forth in claim 17, wherein:

said second piston has a plurality of holes defined therethrough so as to permit said hydraulic fluid to flow between said first and second piston chambers as said second piston is reciprocally moved within said second cylinder.

19. The combination as set forth in claim 18, wherein:

said plurality of holes defined within said second piston comprises a predetermined number of holes;

each one of said predetermined number of holes defined within said second piston has a predetermined diametrical extent; and said hydraulic fluid has a predetermined viscosity value, whereby said predetermined number of holes defined within said second piston, said predetermined diametrical extent of each one of said predetermined number of holes, and said predetermined viscosity value of said hydraulic fluid all comprise factors which predetermine the speed at which said first piston, through means of said first piston rod and said second piston, moves toward said second position and therefore in turn the predetermined time period in which said pneumatically-operated tool must again be operated such that said first piston does not terminate said air flow from said air supply to said pneumatically-operated tool so as to render said pneumatically-operated tool operationally disabled.

20. The combination as set forth in claim 19, wherein:

said predetermined number of holes defined within said second piston, said predetermined diametrical extent of each one of said predetermined number of holes, and said predetermined viscosity value of said hydraulic fluid are such that said predetermined time period, in which said pneumatically-operated tool must again be operated such that said first piston does not terminate said air flow from said air supply to said pneumatically-operated tool so as to render said pneumatically-operated tool operationally disabled, is within the range of 10–15 seconds.

21. The combination as set forth in claim 15, wherein said means operatively connected to said first piston for automatically moving said first piston to said second position, comprises:

a first piston rod having a first end thereof connected to said first piston;

a second piston connected to a second end of said first piston rod;

a second piston rod having a first end thereof connected to said second piston;

a third piston connected to a second end of said second piston rod;

an exhaust conduit fluidically connected between a third cylinder portion of said housing, within which said third piston is operatively disposed, and an exhaust fitting of said pneumatically operated tool for fluidically conducting exhaust gas impulses against said third piston so as to maintain said first piston, through means of said first piston rod, said second piston, said second piston rod, and said third piston, at said first position so as to permit air to flow from said air supply to said pneumatically-operated tool whereby said pneumatically-operated tool can be cyclically operationally enabled; and a portion of said fluid circuit defined within said housing for providing a fluid flow path from said first connection means to said third piston such that supply air operatively impacts against said third piston so as to move said first piston to said second position in the absence of exhaust gas impulses acting upon said third piston.

22. The combination as set forth in claim 17, further comprising:

a second piston rod having a first end thereof connected to said second piston;

a third piston connected to a second end of said second piston rod; and an exhaust conduit fluidically connected between a third cylinder portion of said housing, within which said third piston is operatively disposed, and an exhaust fitting of said pneumatically operated tool for fluidically conducting exhaust gas impulses against said third piston so as to maintain said first piston, through means of said first piston rod, said second piston, said second piston rod, and said third piston, at said first position so as to permit air to flow from said air supply to said pneumatically-operated tool whereby said pneumatically-operated tool can be cyclically operationally enabled, and for permitting said spring member to bias said first piston, through means of said second piston and said first piston rod, toward said second position so as to terminate said air flow from said air supply to said pneumatically-operated tool in the absence of exhaust gas impulses acting upon said third piston as a result of said pneumatically-operated tool not having been operated for a predetermined period of time so as to render said pneumatically-operated tool operationally disabled.

23. The combination as set forth in claim 22, further comprising:

a drain port defined within said housing and fluidically connected to said second connection means integrally formed upon said housing for connection to said pneumatically-operated tool; and a fourth piston rod connected to said third piston for movement with said third piston between a first position at which said fourth piston rod covers said drain port, when said first piston is disposed at said first position as a result of said exhaust gas impulses being conducted against said third piston, and a second position at which said fourth piston rod uncovers said drain port, when said first piston is disposed at said second position, so as to permit drainage of any residual air within said pneumatically-operated tool so as to ensure said pneumatically-operated tool is operationally disabled.

24. The combination as set forth in claim 22, further comprising:

a one-way check-valve fluidically connected to said third cylinder portion of said housing for relieving excessive exhaust pressure within said third cylinder portion of said housing.

25. The combination as set forth in claim 13, wherein:

said pneumatically-operated tool comprises a pneumatically-operated fastener-driving tool.

* * * * *